(12) United States Patent
Richardson

(10) Patent No.: US 6,804,191 B2
(45) Date of Patent: Oct. 12, 2004

(54) PHASE SEQUENCES FOR TIMING AND ACCESS SIGNALS

(75) Inventor: Tom Richardson, South Orange, NJ (US)

(73) Assignee: Flarion Technologies, Inc., Bedminster, NJ (US)

( * ) Notice: Subject to any disclaimer, the term of this patent is extended or adjusted under 35 U.S.C. 154(b) by 0 days.

(21) Appl. No.: 10/407,016

(22) Filed: Apr. 4, 2003

(65) Prior Publication Data

US 2003/0189893 A1 Oct. 9, 2003

Related U.S. Application Data

(60) Provisional application No. 60/370,525, filed on Apr. 5, 2002.

(51) Int. Cl.[7] ............................................... H04J 11/00
(52) U.S. Cl. ..................... 370/208; 370/203; 370/328; 370/503; 370/522
(58) Field of Search ............................ 370/208, 203, 370/204, 206, 207, 210, 328, 329, 330, 336, 343, 344, 436, 480, 481, 482, 483, 503, 516, 519, 335, 342, 441, 509, 522, 236, 410; 375/271, 279, 260, 140, 347, 261

(56) References Cited

U.S. PATENT DOCUMENTS 6,128,276 A * 10/2000 Agee ........................... 370/208
6,301,268 B1 * 10/2001 Laroia et al. ................ 370/481
6,373,859 B1 * 4/2002 Jedwab et al. ............... 370/479
2002/0012402 A1 * 1/2002 Yoshida ....................... 375/279
2002/0105928 A1 * 8/2002 Kapoor et al. .............. 370/334
2003/0067866 A1 * 4/2003 Jung ........................... 370/210

OTHER PUBLICATIONS

Paterson, Kenneth G., "Generalised Reed–Muller Codes and Power Control in OFDM Modulation", pp. 1–30, HP Laboratories Bristol, document HPL–98–57(R.1) (May 1999 Internal Accession Date).

* cited by examiner

Primary Examiner—Brian Nguyen
(74) Attorney, Agent, or Firm—Straub & Pokotylo; Michael P. Straub (57) ABSTRACT

Methods and apparatus for splitting Golay sequences into a plurality of subsets of sequence elements and transmitting the subsets are described. The sequence subsets include an equal number of elements, e.g., symbols, from the split sequence and are transmitted using one group of tones per subset. The tones in each group of tones are uniformly spaced with one symbol being transmitted on each tone. The groups of tones are separated from one another by a frequency spacing which is greater, e.g., many times greater, than the frequency spacing between the tones in each group. Low peak to average power ratios are achieved for the transmitted signals while at the same time allowing for a wide band of frequencies to be used to transmit the split sequence. This leads to greater frequency diversity and facilitates frequency and phase related signal measurements by a device receiving the signal.

21 Claims, 6 Drawing Sheets

PRIOR ART

PHASE SEQUENCES FOR TIMING AND ACCESS SIGNALS

RELATED APPLICATIONS

The present application claims the benefit of U.S. Provisional Patent Application Ser. No. 60/370,525, titled "PHASE SEQUENCES FOR TIMING AND ACCESS SIGNALS", which was filed on Apr. 5, 2002 and which is hereby expressly incorporated by reference.

FIELD OF THE INVENTION

The present invention is directed to methods and apparatus for transmitting signals suitable for use in timing recovery in wireless communication systems, e.g., frequency division multiplexed (FDM) systems.

BACKGROUND

Orthogonal Frequency Division Multiplexing (OFDM) has emerged as a viable scheme for wireless communications. In OFDM schemes signals are modulated onto multiple carriers in the frequency domain and then transformed, usually via a Fast Fourier Transform (FFT), to produce the time domain version of the signal. One drawback of OFDM systems concerns their high peak-to-average power ratio requirements. This refers to the fact that the transmitted signals in OFDM schemes, when viewed in the time domain, often exhibit large excursions in amplitude. If the transmitter seeks a high fidelity transmission then the dynamic range of the transmitter must be correspondingly large, so as not to distort these large excursions. This has two effects. One is that it increases the cost of power amplifiers required in the transmitter. The second is that signals cannot be transmitted at full power since power margins must be left to allow for occasional large excursions.

Golay sequences are sequences of symbols, e.g., QPSK symbols, that exhibit low peak to average power ratios both in the frequency domain and the time domain when the symbols of the sequence are transmitted using uniformly spaced tones. In the prior art, it was generally assumed that to obtain the benefit of low peak to average power ratios the symbols of the Golay sequence had to be transmitted using uniformly spaced tones in the frequency domain. It has been proposed to use such sequences for transmission in OFDM systems with the sequences being transmitted using a contiguous set of uniformly spaced tones as shown in FIG. 1.

Figure 1:
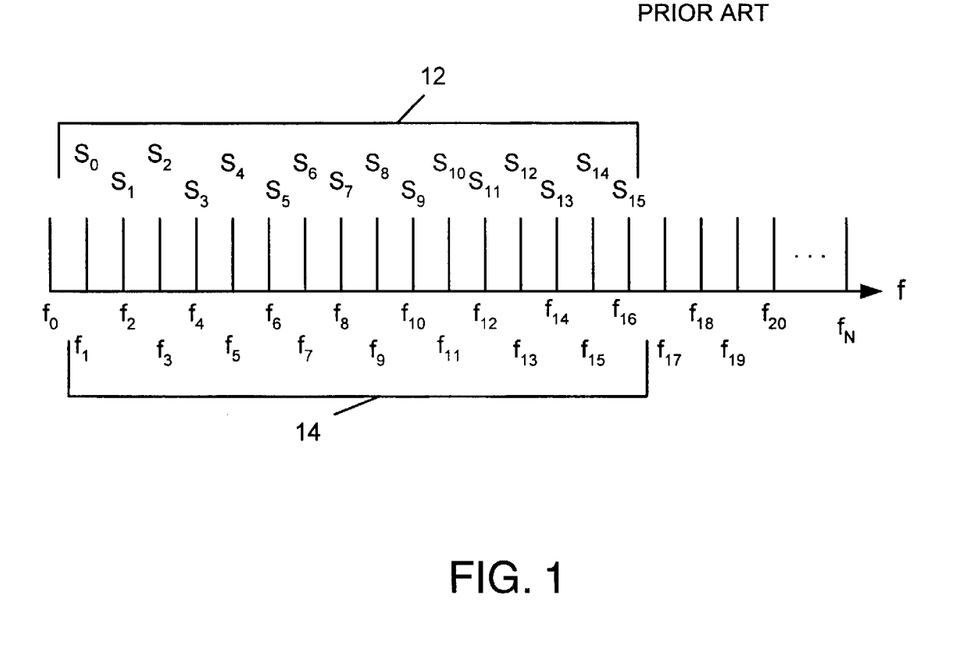
FIG. 1 illustrates a prior art technique for transmitting a Golay sequence using tones which are uniformly spaced in the frequency domain.

In FIG. 1, the frequency spectrum used to transmit symbols is divided in to a set of N+1 tones, $f_0$ through $f_N$. The set 12 of symbols $S_0$ through $S_{15}$, of an exemplary sixteen symbol Golay sequence, are transmitted in FIG. 1 using a set 14 of contiguous uniformly spaced tones which are a subset of the full set of utilized tones $f_0$ through $f_N$. Transmitting the symbols of the sequence 12 in this manner provides a signal with low peak to average power ratios. Unfortunately, requiring tones used to transmit the Golay sequence to be uniformly spaced often limits the spectrum over which the sequence of tones will be broadcast, particularly when the number of tones in the sequence is relatively small compared to the total number of tones used in a system.

In many cases, it is desirable to maximize the frequency range over which tones are transmitted. The greater range of frequencies can provide a degree of frequency diversification and increase the ability to accurately measure transmission delays as a function of signal phase shift. Unfortunately, the existing requirement for the tones of a Golay sequence to be transmitted using uniformly spaced tones to obtain the known benefits of such a signal limits the utility of such sequences.

Another difficulty associated with the use of Golay sequences is that there are relatively few Golay sequences so high communication rates are difficult to obtain this way. Nevertheless, there may be certain circumstance in which the use of Golay sequences or Golay like sequences is desirable.

OFDM systems require timing synchronization between the transmitter and receiver. In, e.g., a mobile wireless setting, this normally requires that the mobile transmit a signal that can be used to synchronize the two participants. Timing is typically determined by examining phase offsets of the received signal as a function of frequency. Different frequencies experience different phase offsets as a function of transmission delay. Generally, the greater the difference in frequency between signals, e.g., symbols, used to estimate the transmission delay in this manner, the greater the accuracy of the transmission timing delay estimate.

Another related system function is access. A mobile often requests access to the base station before it begins transmitting its user information. An access signal should indicate to the base station that the mobile is requesting access to that particular base station. The access signal should be recognizable by the base station as an access signal intended for that base station. The signal transmitted by the mobile should therefore indicate the identity of the base station to which it is requesting access. In order to conserve mobile power, minimize out of band transmission, and/or admit high energy transmission of access signals without undue distortion, the access request signal should, preferably, also exhibit a low peak to average power ratio.

In view of the above discussion, it can be appreciated that improved signaling techniques suitable for use in FDM systems, e.g., mobile OFDM systems, are desirable. For example, there is a need for improved signals which can be transmitted and examined to accurately detect transmission timing delays. In addition, there is a need for efficient access request signals, e.g., symbol sequences, with low peak to average ratios which can be associated with different base stations.

While Golay sequences offer some possible advantages with regard to satisfying these two needs, the restriction that the elements of the Golay sequence need to be transmitted using uniformly spaced frequencies needs to be overcome if such sequences or similar sequences are to be highly useful.

SUMMARY OF THE INVENTION

The present invention is directed to methods and apparatus for signaling timing and access information in wireless systems, e.g. frequency division multiplexed mobile systems. Exemplary systems in which the present invention may be used are described in U.S. patent application Ser. No. 09/805,887 titled Signaling Method in an OFDM Multiple Access System.

In accordance with the present invention signals are used which are capable of serving the dual purpose of access request signals and signals which are used to determine transmission timing delays and/or errors. The signals are well suited for use in FDM wireless systems. While not precisely Golay sequences, the proposed signals are based on Golay sequences and exploit a certain recently discovered structure underlying Golay sequences.

In one exemplary embodiment, when a mobile desires access to a particular base station it first determines that base station's identifier. The mobile then transmits a timing and access signal, generated in accordance with the present invention, that is a function of that identifier so that the base station will recognize that a mobile is querying it for access. One feature of the invention is directed to a particular form for the transmitted signals.

OFDM transmission takes place by transmitting on equally spaced frequencies $w_i = w_0 + i w_s$ $i = 1, \ldots, n$. Roughly speaking, the complex baseband representation of a typically transmitted signal takes the form $\Sigma_i h_i e^{j(w_i t)}$. Average transmitted power is proportional to $(\Sigma_i h_i^2)^{1/2}$ while peak transmitted power is proportional to $\max_t |\Sigma_i h_i e^{j(w_i t)}|$. The peak-to-average power ratio is the ratio of these to quantities $$PAR := (\max_t |\Sigma_i h_i e^{j(w_i t)}|)/(\Sigma_i h_i^2)^{1/2}$$

and it is desirable in practice that this quantity be small.

Golay sequences are sequences hi for which the PAR is known to be quite small. In fact, it is known that $PAR < 2^{1/2}$ for all Golay sequence. The Golay sequences come in complementary pairs. As a canonical example we will consider Golay sequences of length 16.

Additional features and benefits of the methods, apparatus and signal sequences of the present invention will be apparent in view of the detailed description which follows.

DETAILED DESCRIPTION OF THE INVENTION

Figure 2:
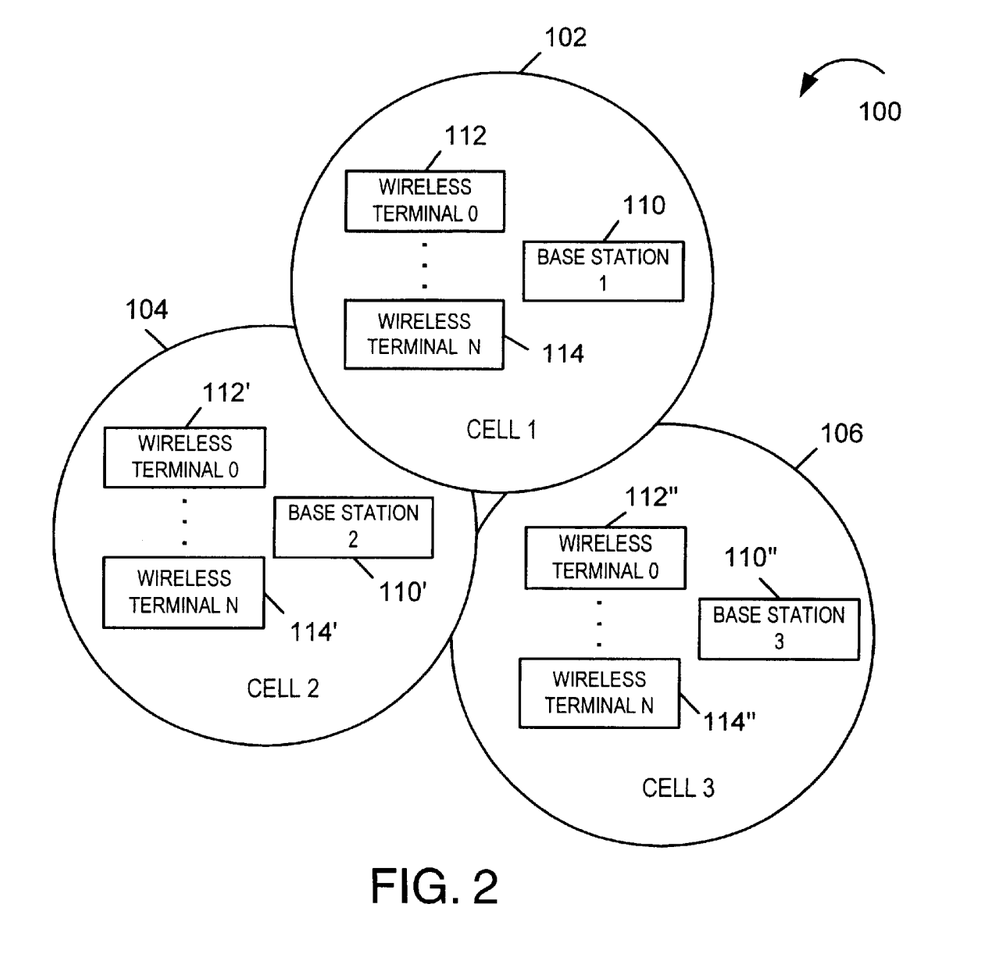
FIG. 2 illustrates an exemplary communications system which implements the methods of the present invention.

FIG. 2 illustrates a communications system 100 implemented in accordance with the present invention. The system 100 includes a plurality of cells 102, 104, 106. Each of the cell includes a plurality of wireless terminals, sometimes called mobile nodes (112, 114) (112', 114') (112", 114"), respectively. Each cell 102, 104, 106 also includes a base station 110, 110', 110". The wireless terminals 112, 114 in each cell communicate with the base station 110 in the cell via wireless communications links, e.g., over the air signal broadcasts. In one exemplary embodiment OFDM signaling is used for this purpose. The base stations 110, 110', 110" in each cell may be coupled to the Internet and/or one another via other communications links allowing communication between cells. In transmitted signals base stations 110, 110' and 110" may be identified using unique identifiers, e.g., different sequences of symbols generated and transmitted in accordance with the invention. In this manner, a base station is able to determine if a signal, e.g., message is addressed to it. In addition, mobile nodes 112, 114 can determine which base station 110, 110', 110" is the source of a particular transmitted signal which includes the base station identifier. In order to maintain symbol timing synchronization, base stations 110 may transmit timing control, e.g., update information, to mobile nodes in a cell so that the mobile nodes can update their clocks and/or adjust their transmission timing. The timing control information communicated to a mobile node may include channel delay information determined by base station for a particular mobile node 112, 114 based on a signal transmitted from the mobile node 112, 114 to the base station 110. Such individualized timing updates are important due to the fact that as a mobile node moves in a cell, the delay in a transmitted signal reaching the base station 110 will change. If symbols are to reach the base station from different mobile nodes in a synchronized fashion, it is important that mobile nodes 112, 114 update their transmission times periodically to take into consideration changes in the amount of time it takes a signal to reach the base station 110.

Figure 3:
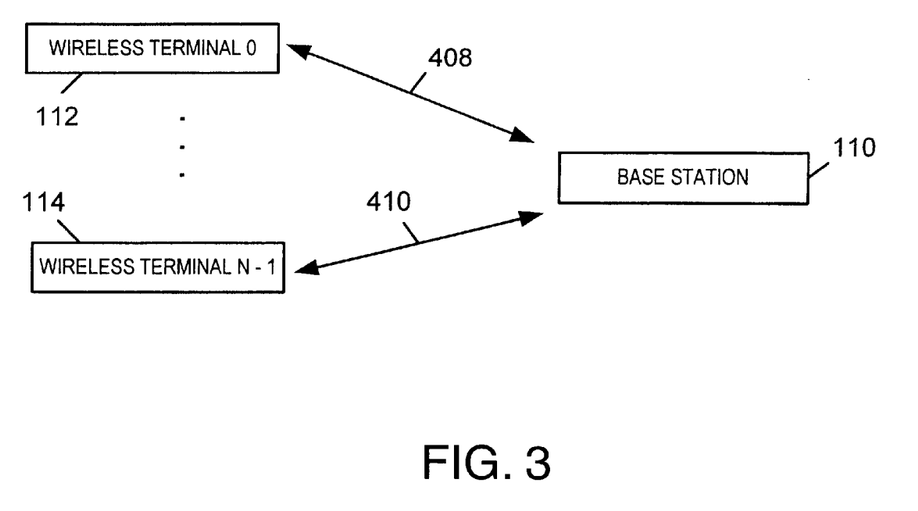
FIG. 3 illustrates the transmission of signals, e.g., signals generated in accordance with the present invention, between a base station and wireless terminal.

FIG. 3 illustrates an exemplary cell 102 of the communications system 100 shown in FIG. 2. In the cell 102, multiple mobile terminals, shown as wireless terminals 0 (112) through terminal N−1 (114) communicate with the base station 110 through the use of communication signals 408, 410. Signals 408 may include, e.g., an access request signal generated by mobile node 112 and transmitted to base station 110. The access request signal may be based on a Golay sequence assigned to correspond to an individual base station 110. As discussed below, different sequences can be associated with different base stations allowing the sequences to be used as base station identifiers. The signals 408 may also include a timing control signal generated by base station 110 and transmitted to the mobile node 112. The timing control signal may be generated by the base station 110 based on the results of processing a received signal, e.g., an access request signal from the mobile node 112, to determine channel conditions and/or channel, e.g., transmission, delays. Each mobile terminal 112, 114 may correspond to a different mobile user and are therefore sometimes referred to as user terminals. The signals 408, 410 may be, e.g., OFDM signals. The base station 110 and mobile terminals 112, 114 each implement one or more steps in accordance with various methods of the present invention. In accordance with the invention, signals 408, 410 include signals based on Golay sequences which have been split into multiple groups each of which is then transmitted using different groups of tones. The groups of tones used to transmit the Golay sequence members are spaced apart by a frequency amount greater than the frequency spacing between tones used to transmit individual members of each of the multiple groups. Nevertheless, the sequence transmitted will have good peak to average power ratio properties similar to those of ordinary Golary sequences. In an OFDM transmission, the received tones undergo a phase rotation of the form $e^{i(\phi + w\tau)}$ where $\phi$ is an unknown fixed phase, $\tau$ is the unknown delay and w represents the relative tone frequency. For timing control, the receiver estimates $\tau$. If a precise estimate of the phase rotation is available for two distinct frequencies, $w_1$ and $w_2$ say, then an estimate of can be formed. In practice the estimates will be distorted. In view of this fact, it is desirable that $w_1$ and $w_2$ be widely separated so as to increase the accuracy of the resulting estimate of $\tau$. Assuming $\tau$ is not too large, which will usually be the case in practice, it may be desirable to transmit on several tones on frequencies close to $w_1$ and $w_2$ to improve the estimate of the phase rotations at $w_1$ and $w_2$. For closely spaced frequencies the differences in the phase rotation will be quite small. Furthermore, using several closely spaced tones in this way, it is possible to embed information such as the base station identifier to enhance the base station's ability to detect the access signal. Thus, as discussed above, the signals between a mobile node 112, 114 and a base station 110 may include an access request which includes a sequence representing a base station identifier. The access request may be transmitted to the base station 110 using groups of tones in accordance with the present invention. The signals 408, 410 may also include timing and/or other feedback information, derived by the base station 110 from the received access request signal, which is transmitted back to the mobile node 112, 114 from which the access request signal originated.

Figure 4:
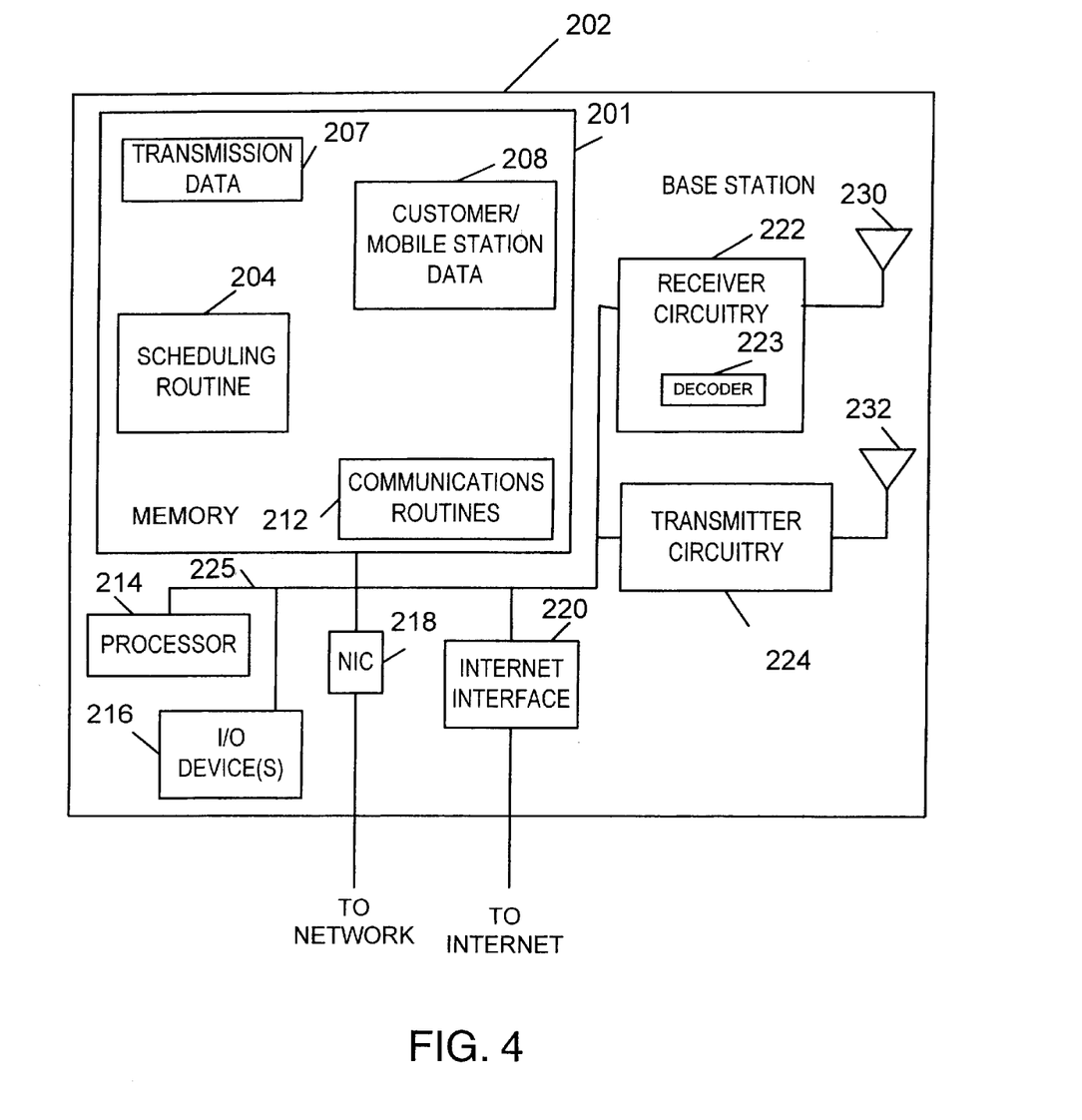
FIG. 4 illustrates a base station implemented in accordance with the present invention.

FIG. 4 illustrates an exemplary base station 202, implemented in accordance with the invention. The base station 202 may be used as any one of the base stations 110, 110', 110" shown in FIG. 2. The base station 202 includes a receiver antenna 230 and receiver circuitry 222. Receiver circuit 222 includes a decoder 223 for decoding received symbols and/or for making channel estimates and transmission delay estimates as part of the decoding process. Such channel information is communicated to the processor 214 which uses it to generate timing control messages in accordance with the invention. The base station 202 also includes a transmitter circuitry 224 and a transmission antenna 232. The transmitter is capable of generating and transmitting signals including symbol sequences in accordance with the present invention. It is also capable of transmitting timing control signals including timing control information generated as a function of a received signal including symbol sequences transmitted by a mobile node in accordance with the invention. The receiver and transmitter circuitry 222, 224 is coupled by a bus 225 to a processor (e.g., CPU) 214 memory 201, I/O devices 216 a network interface card 218 and an Internet interface 220. The Internet interface 220 couples the base station 202 to the Internet. Memory 201 includes routines, which when executed by the processor 214, cause the base station 202 to operate in accordance with the invention. Memory includes communications routines 212 used for controlling the base station 202 to perform various communications operations and implement various communications protocols. Among the performed communications operations controlled by routine 212 is the generation of timing feedback and control information from received signals and the transmission of such information to mobile nodes. The memory 201 also includes transmission data 207, customer/mobile station data 208 and a scheduling routine 204. The scheduling routine 204 is used to schedule transmissions to/from mobile nodes in the cell served by the base station 202.

Figure 5:
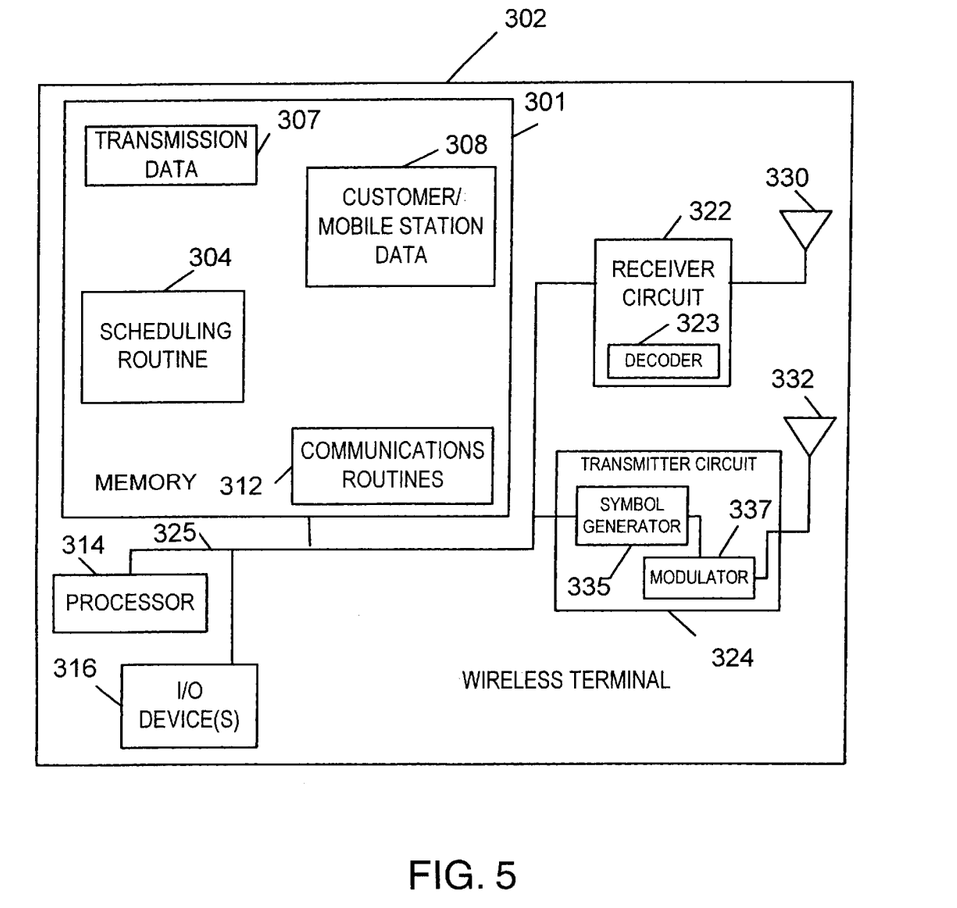
FIG. 5 illustrates a wireless terminal, e.g., mobile station, implemented in accordance with the invention.
Figure 6:
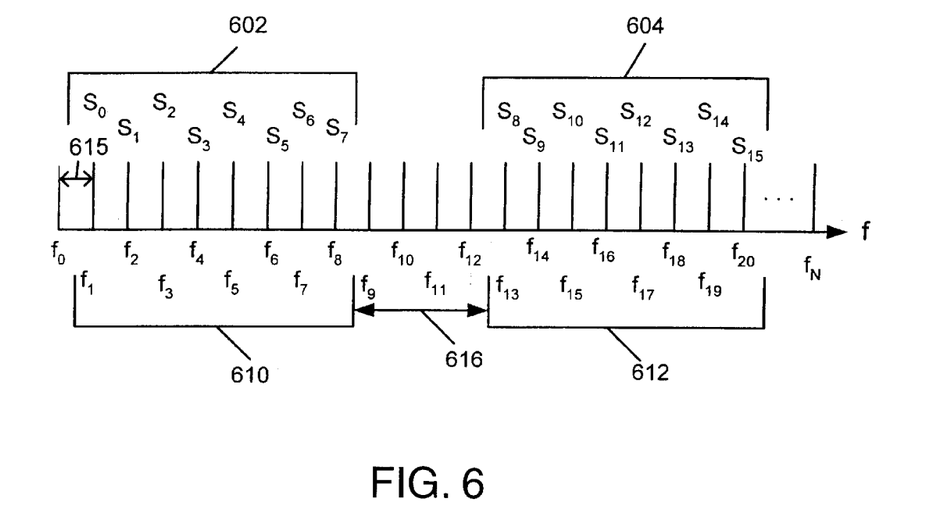
FIGS. 6 and 7 illustrate the transmission of split Golay sequences in accordance with the invention.
Figure 7:
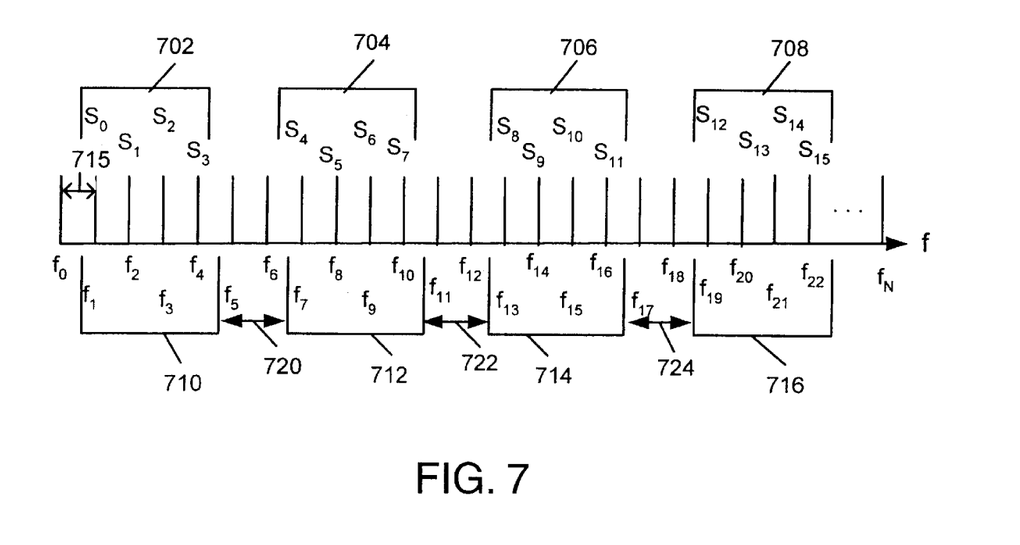

FIG. 5 illustrates an exemplary mobile node 302, i.e., a wireless terminal implemented in accordance with the present invention. The mobile node 302 may be used as a wireless terminal in the system 100 shown in FIG. 2. The mobile node 302 includes receiver and transmitter antennas 330, 332 which are coupled to receiver and transmitter circuitry 322, 324 respectively. The receiver circuitry 322 includes a decoder 323 while the transmitter circuitry 324 includes a symbol generator 335 and a modulator 337. The symbol generator 335 generates symbols corresponding to data or a predefined sequence, e.g., a Golay sequence, to be transmitted. In accordance with the present invention, a Golay sequence split into multiple parts may be used, e.g., as an access request signal and/or base station identifier. Different sequences may be used as access requests directed to different base stations with the particular sequence serving as a base station identifier. The modulator 337 receives symbols to be modulated and modulates them onto different tones for transmission purposes. The tones used to transmit a split Golay sequence may be selected as discussed below. One symbol may be transmitted on each of a plurality of tones allowing multiple symbols, e.g., an entire Golay symbol sequence split according to the present invention, to be transmitted during a single time period, e.g., a single symbol transmission time period as shown in FIGS. 6 and 7.

The receiver and transmitter circuits 322, 324 are coupled by a bus 325 to a memory 301, processor 314 and I/O devices 316, e.g., keypad and display. Processor 314, under control of one or more routines stored in memory 301 causes the mobile node 302 to operate in accordance with the methods of the present invention, e.g., to transmit sequences of symbols as described below and to respond to timing correction and/or timing control feedback signals received from a base station. In order to control mobile node operation, memory 301 includes communications routine 312. In addition, the memory includes transmission data 307, customer/mobile station data 308 and a scheduling routine 304. Transmission data 307 includes information identifying different Golay sequences which are used as base station identifiers and/or other signals such as access request signals. Information relating to how to split the Golay sequences for transmission purposes, e.g., in terms of the number of equally sized subsets the sequence is to be split into and the frequency gap between subsets to be used for transmission purposes may, and in various embodiments is, stored in transmission data 307.

Scheduling routine 304 controls the scheduling of signals to be transmitted. Such signals may include one or more Golay sequences which are to be split and transmitted in accordance with the present invention. Scheduling routine 304 is responsive to scheduling information received from a base station and schedules data transmissions at times authorized by a base station or at predetermined times. Scheduling routine 304, in various embodiments, causes different symbol sequences, e.g., the sequences shown in FIGS. 6 and 7, to be transmitted at different times. In some cases split Golay sequences having different frequency gaps between symbol subsets are scheduled to be transmitted at different times. The sequences transmitted at different times may also have different total numbers of symbols in the transmitted sequences and/or different numbers of symbol subsets into which the Golay sequence was divided.

Golay sequences of length $2^k$ over MPSK alphabet have recently been shown to be representable as a finite union of certain shifts of a linear code whose basis over MPSK is a first order Reed-Muller code. In the case of length 16 Golay sequences over MPSK alphabets, the sequences are (See "Generalized Reed-Muller Codes and Power Control in OFDM Modulation" by Kenneth G. Paterson, August 1998, available at: http://www.hpl.hp.com/techreports/98/HPL-98-57R1.html as HP technical report #HPL-98-57R1) those vectors of elements from the complex unit circle whose phases are all linear combinations over Z/M (the integers modulo M) of the row vectors in the matrix $$\begin{bmatrix} 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 1 & 1 & 1 & 1 & 1 & 1 & 1 & 1 \\ 0 & 0 & 0 & 0 & 1 & 1 & 1 & 1 & 0 & 0 & 0 & 0 & 1 & 1 & 1 & 1 \\ 0 & 0 & 1 & 1 & 0 & 0 & 1 & 1 & 0 & 0 & 1 & 1 & 0 & 0 & 1 & 1 \\ 0 & 1 & 0 & 1 & 0 & 1 & 0 & 1 & 0 & 1 & 0 & 1 & 0 & 1 & 0 & 1 \end{bmatrix} = \begin{bmatrix} v_1 \\ v_2 \\ v_3 \\ v_4 \\ v_5 \end{bmatrix}$$

multiplied by $2\pi/M$, summed with one of the following vectors $$\begin{bmatrix} 0 & 0 & 0 & \pi & 0 & 0 & \pi & 0 & 0 & 0 & \pi & \pi & \pi & 0 & \pi \\ 0 & 0 & 0 & \pi & 0 & \pi & 0 & 0 & 0 & 0 & \pi & \pi & 0 & \pi & \pi \\ 0 & 0 & 0 & 0 & \pi & \pi & 0 & 0 & \pi & 0 & \pi & 0 & 0 & \pi & \pi \\ 0 & 0 & 0 & \pi & 0 & 0 & 0 & \pi & 0 & \pi & 0 & 0 & \pi & 0 & \pi & \pi \\ 0 & 0 & 0 & 0 & 0 & \pi & 0 & \pi & 0 & \pi & \pi & 0 & 0 & 0 & \pi & \pi \\ 0 & 0 & 0 & 0 & 0 & 0 & \pi & \pi & 0 & \pi & \pi & 0 & 0 & \pi & 0 & \pi \\ 0 & 0 & 0 & \pi & 0 & 0 & \pi & 0 & 0 & \pi & 0 & 0 & 0 & \pi & \pi & \pi \\ 0 & 0 & 0 & \pi & 0 & \pi & 0 & 0 & 0 & 0 & \pi & 0 & 0 & \pi & \pi & \pi \\ 0 & 0 & 0 & 0 & 0 & \pi & \pi & 0 & 0 & 0 & \pi & \pi & 0 & \pi & 0 & \pi \\ 0 & 0 & 0 & \pi & 0 & 0 & 0 & \pi & 0 & 0 & \pi & 0 & \pi & \pi & 0 & \pi \\ 0 & 0 & 0 & 0 & 0 & \pi & 0 & \pi & 0 & 0 & \pi & \pi & \pi & 0 & 0 & \pi \\ 0 & 0 & 0 & 0 & 0 & 0 & \pi & \pi & 0 & \pi & 0 & \pi & \pi & 0 & 0 & \pi \end{bmatrix}$$

Thus, altogether, there are $12*M^5$ Golay sequences, where M represents the number of symbols in an MPSK alphabet used to define the sequence. It is these sequences which may be split and transmitted in accordance with the invention. For purposes of explaining the invention we shall assume M=4 (QPSK).

Let $h_1, \ldots, h_{16}$ be a Golay sequence as above. Suppose that instead of using consecutive frequencies we use consecutive frequencies for $h_1, \ldots, h_8$ and $h_9, \ldots, h_{16}$. In addition we do not position the two groups adjacent to each other. Such splitting is useful to provide protection against frequency dependent fading. The PAR is still quite small, satisfying the Golay bound. The mathematical argument is the following.

The peak value (in time) of a Golay sequence signal over equally spaced frequencies is given by $$\max\left\{t: \sum_{k=1}^{16} e^{i(w_0+kwt)} h_k \right\}$$

and this quantity is known to satisfy the bound indicated above. If we split the sequence, using equally spaced frequencies but offsetting the second half of the sequence with respect to the first then the peak is given as $$\max\left\{t: \sum_{k=1}^{8} e^{i(w_0+kwt)} h_k + \sum_{k=9}^{16} e^{i(w_0'+kwt)} h_k \right\}$$

where $w_0'-w_0$ represents the frequency offset. Now, note that this maximum is given also by $$\max\left\{t: \sum_{k=1}^{16} e^{i(w_0+kwt)} g_k \right\}$$

where we set $g_k=h_k$ for $k=1, \ldots, 8$ and $g_k=e^{i(w_0'-w_0)}h_k$ for $k=9, \ldots, 16$. The key observation is that the sequence $g_k$ can be interpreted as a Golay sequence over a sufficiently large MPSK alphabet, (so that $e^{i(w_0'-w_0)}$ is (nearly) an element of that alphabet. This follows from the fact that $v_2$ is a basis vector for Golay sequences over the MPSK alphabet. Thus, the peak power bound that applies to allow Golay sequences still applies even when the sequence is split in accordance with the invention. For example, the sequence may be split into two halves. One can transmit the first half of the Golay sequence on equally spaced tones centered on a frequency $w_1$ and the second half of the Golay sequence on identically equally spaced tones centered on a frequency $w_2$ where $w_1$ and $w_2$ are far apart. The fact that they are far apart facilitates accurate transmission delay estimation, as discussed earlier. The fact that the tones used for each half can be closely spaced means that the phase rotation experienced within each half will be nearly constant. Thus, the first and second half can be detected up to an arbitrary phase rotation of each half. The relative rotation of the two halves provides the delay estimate. To indicate the base station identifier the remaining degrees of freedom in the choice of the Golay sequence (the multipliers of v3, v4, and v5) may be used as discussed further below.

To capture timing (delay) there are advantages to spreading the signal to well separated points in the allocated frequency band as discussed above. Moreover, it can be desirable to randomize the locations of the signal in the band to minimize collisions between different mobiles trying to access the system at the same time. Second, spreading the signal offers some protection against frequency dependent fading. The above scheme enables the use of these features while retaining low peak to average power ratios.

In the case of access request signals, it is advantageous to have unique identifiers (of the base station) regardless of the separation and to avoid the need to undo the rotation caused by the shift. This can be accomplished by avoiding the use of the basis vector $v_2=(0 \ldots 01 \ldots 1)$ in the choice of signatures, e.g., symbol sequences. Moreover, in noncoherent wireless communication (communication where the channel is not known at the receiver) the basis vector $v_{1=}(1,\ldots,1)$ is irrelevant (unrecoverable) since the received signal undergoes an arbitrary constant phase shift depending on the distance of the mobile to the base station. The proposed Golay sequences offer the further advantage in this regard that they form a good code. That is, the Golay sequences are well separated in signal space reducing the probability of confusion.

We propose the use of split Golay signature sequences for access signals as well as for other signals. Such signals may be transmitted by a mobile node to a base station in accordance with the invention and then used to generate channel information. In the OFDM setting, these signals take the form, e.g., of $h_1, \ldots, h_8$ on frequencies $w_i=w_0+iw_\delta$ $i=1, \ldots, 8$ and take the form $h_9, \ldots, h_{16}$ $i=9, \ldots, 16$ on frequencies $w_i=w_0'+iw_\delta$ where $h_1, \ldots, h_{16}$ is a Golay sequence over, e.g., the QPSK alphabet, with $v_1$ and $v_2$ components set to 0 and, typically, we have $w_0'$ significantly larger, e.g., several times larger, than $w_0$.

The general picture for the length 16 Golay sequences is as follows. Given a Golay sequence put on equally spaced tones, one can take any subset as indicated by one of the basis vectors v2, . . . , v5, where the is indicate the subset, and translate that subset in frequency, while fixing the spacing within the subset. For example, V3 can be used to select elements from a 16 element Golay sequence to form two subsets, a first subset including elements ($S_0, S_1, S_2, S_3, S_8, S_9, S_{10}, S_{11}$) and a second set ($S_4, S_5, S_6, S_7, S_{12}, S_{13}, S_{14}, S_{15}$). The resulting transmitted sequence will still have good peak to power average ratio properties. Furthermore, this translation of subsets may be performed more than once with different choices of the basis vectors and the good peak to average power ratio property still holds.

In the exemplary OFDM system the access signal is selected to be a function of a base station's identifier. However, in other embodiments, the access signal is generated in accordance with the present invention without being a function of the base station identifier.

By using signals generated in accordance with the invention the system accrues the following advantages. The signals are well separated in signal space from each other, being elements of code, and they are sufficient in number so that each base station can have a sequence distinct from all nearby neighbors, the signals can be spread out in the band providing robustness estimates of timing delay, portions of the signal may be clustered so that within a cluster phase rotation is nearly constant, and the signals exhibit low peak-to-average power ratios, allowing them to be transmitted at high power.

In accordance with the invention, a Golay sequence including $N=2^k$ complex symbols, is split into 2 subsets in up to k different ways as indicated by the basis vectors of the underlying first order Reed-Muller code. Each of the subsets includes half of the elements from the set to which the splitting operation was applied. For a given iteration half of the elements in the entire sequence will normally be shifted in frequency by the same amount. The splitting can be performed iteratively on the subsets produced by the splitting operation with the splitting performed during each iteration being performed in the same manner to each subset existing at the start of the iteration. This results in $X=2^l$ subsets for transmission purposes, where l is the number of different splits used, with each subset having N/X elements. The elements of each of the $2^l$ subset are transmitted using equally spaced tones and relations between subsets arises from the limitation that any of the k possible translation subsets must be translated while maintaining their spacing, which may not be uniform if previous translations have occurred. In practice, the most useful cases will have l=1 or l=2 resulting in 2 or 4 subsets, respectively. The most useful arrangements will be groups of tones that are tightly spaced within groups but the groups themselves are spread out in frequency. This results in the groups of tones corresponding to the individual subsets being spaced apart from one another in the frequency domain by an amount which is at least several times the frequency spacing between tones in a group. The frequency spacing between multiple groups of tones used to transmit the subsets of Golay sequence members is usually uniform, the precise relations being determined by the translation construction. In various implementations the spacing between groups of tones is at least 5, 10 and 20 times the frequency spacing between tones in a tone group.

FIG. 6 illustrates the transmission of a Golay sequence including 16 complex symbols $S_0$ through $S_{15}$. In the system of FIG. 6, N+1 tones are used in parallel during a symbol time by elements of the system to communicate symbols. Thus a total of N+1 symbols may be transmitted in a single symbol transmission time period. In accordance with one exemplary embodiment of the invention, the 16 symbol Golay sequence is split into two equally sized subsets, i.e., first and second subsets 602, 604 with each subset including 8 symbols. The first subset 602 is transmitted using a first group 610 of equally spaced tones $f_1$ through $f_8$. The second subset 604 is transmitted using a second group 612 of equally spaced tones $f_{13}$ through $f_{20}$. Note that in the FIG. 6 example, spacing between individual tones 615 is the difference between any two consecutive tones, e.g., $f_1-f_0$. This first spacing 615 is the spacing between tones in the first and second group 610, 612 used to transmit the symbols of the Golay sequence. However, there is a frequency gap 616, e.g., a second frequency spacing, between the first and second tone groups 610, 612 which is several times the frequency gap between individual tones 615 used to transmit the symbols in each of the subsets 602, 604.

FIG. 7 illustrates an alternative embodiment where the 16 symbol Golay sequence is divided into 4 subsets 702, 704, 706, 708. Each subset of symbols is transmitted using a different group of tones 710, 712, 714, 716. As in the previous example, the frequency gaps 720, 722, 724 between the tone groups 710, 712, 714, 716 is greater than the frequency gap between the tones 715 in each group of tones.

The symbols of a Golay sequence are split different ways in FIGS. 6 and 7 resulting in different transmitted signals. In one embodiment the different signals illustrated in FIGS. 6 and 7 are transmitted at different times by a mobile node for different purposes. In such an embodiment, the meaning of the information to be transmitted may be used by the mobile node to determine whether the signal of FIG. 6 or FIG. 7 is to be transmitted. In cases where periodic transmission of the FIGS. 6 and 7 signals are to occur, the 16 symbol sequence is split and transmitted in different ways as a function of time with the FIG. 6 signal being transmitted at one time and the FIG. 7 signal being transmitted at another time.

While 16 symbol transmission sequence are shown for purposes of explaining the invention Golay sequences with other numbers of elements may be split and transmitted in accordance with the invention. Splitting and transmitting Golay sequences in accordance with the invention provides many of the low peak to average power advantages known to be associated with a Golay sequence transmitted using uniformly spaced tones while allowing elements of the sequence to be transmitted over a wider frequency range than would be possible in many cases if the elements had to be transmitted using a single set of uniformly spaced tones.

The wireless terminals of the present invention in FIGS. 2, 3 and 5 are novel in that they include circuitry and/or software for generating access signals in accordance with the present invention. Similarly base station 202 is novel in that it includes circuitry for generating, receiving and/or transmitting signals having the format of the present invention discussed above.

The generation and transmission of signals, e.g., access signals, in accordance with the invention can be performed using hardware, software and/or a combination of hardware and software. For example, in the FIG. 3 embodiment, an access signal having the inventive form discussed above may be generated by transmitter circuit 324 under control of processor 314 which executes a communications routine 312. The communications routine 312 may include one or more instructions to control the generation of the access signal in accordance with the invention.

What is claimed is:

1. A communications method, the method comprising:
generating a first set of complex values, the phases of said complex values being a Golay sequence, said first set of complex values being subdivided into a first plurality of subsets, each subset in said first plurality of subsets having the same number of elements; and
transmitting each of said first plurality of subsets using a plurality of uniformly spaced tones, a different group of tones being used to transmit each of said subsets, the tones within each group being separated from one another in frequency by a first amount, each group of tones used for transmitting one of said first plurality of subsets being separated in the frequency domain from the nearest one of said groups of tones used for transmitting one of said first plurality of subsets by a second amount which is greater than said first amount.

2. The communications method of claim 1, wherein said second amount is at least 5 times said first amount.

3. The communications method of claim 1, wherein said second amount is at least 10 times said first amount.

4. The communications method of claim 1,
wherein said first set of complex values includes N values, N being an integer power of 2, and
wherein said first plurality of subsets includes X subsets, where X is equal to a power of 2.

5. The communications method of claim 4, wherein X is 2.

6. The communications method of claim 5, wherein N is 16.

7. The communications method of claim 4, wherein X is 4.

8. The method of claim 1, further comprising:
generating a second set of complex values whose phase constitute a Golay sequence, said second set of complex values being subdivided into a second plurality of subsets, each subset in said second plurality of subsets having the same number of elements; and
transmitting each subset in said second plurality of subsets using a plurality of uniformly spaced tones, a different group of tones being used to transmit each of said subsets, the tones within each group being separated from one another in frequency by a third amount, each group of tones used for transmitting one of said second plurality of subsets being separated in the frequency domain from the nearest one of said groups of tones used for transmitting one of said second plurality of subsets by a fourth amount which is greater than said third amount.

9. The method of claim 8, wherein said third and fourth amount are a function of an intended signal interpretation by a receiver of the second set of complex symbols.

10. The method of claim 9, wherein said third and fourth amounts are different for different types of information which may be represented by said second set of complex symbols, one type of information which may be represented by said second set of complex symbols being an access request.

11. The method of claim 1, further comprising the steps of:
operating a base station to receive a signal including the transmitted subsets of complex values;
operating the base station to generate a time delay estimate from at least a portion of the received signal corresponding to the transmitted subsets of complex values.

12. The method of claim 11, wherein said step of generating a first set of complex values and transmitting each of said first plurality of subsets is performed by a mobile node, the method further comprising:
operating the base station to transmit a timing control signal to said mobile node, said timing control signal being a function of said generated time delay estimate.

13. The method of claim 1, wherein said time delay estimate is a transmission channel time delay estimate corresponding to the time to transmit said plurality of subsets from said mobile node to said base station.

14. A communications method, the method comprising:
generating a first set of complex values, the phases of said complex values being a Golay sequence, said first set of complex values being subdivided into a first plurality of subsets, each subset in said first plurality of subsets having the same number of elements; and
transmitting each of said first plurality of subsets using a plurality of uniformly spaced tones, a different group of tones being used to transmit each of said subsets, the tones within each group being separated from one another in frequency by a first amount, each group of tones used for transmitting one of said first plurality of subsets being separated in the frequency domain from the nearest one of said groups of tones used for transmitting one of said first plurality of subsets by a second amount which is greater than said first amount;
generating a second set of complex values whose phase constitute a Golay sequence, said second set of complex values being subdivided into a second plurality of subsets, each subset in said second plurality of subsets having the same number of elements; and
transmitting each subset in said second plurality of subsets using a plurality of uniformly spaced tones, a different group of tones being used to transmit each of said subsets, the tones within each group being separated from one another in frequency by a third amount, each group of tones used for transmitting one of said second plurality of subsets being separated in the frequency domain from the nearest one of said groups of tones used for transmitting one of said second plurality of subsets by a fourth amount which is greater than said third amount, wherein said third and fourth amount are a function of the time said second set of complex values is transmitted.

15. The method of claim 14, wherein said third and fourth amounts will vary depending on when said second plurality of subsets is transmitted.

16. A communications system, comprising:
a first communications device including:
means for generating a first set of complex values whose phase constitute a Golay sequence, said first set of complex values being subdivided into a first plurality of subsets, each subset in said first plurality of subsets having the same number of elements; and
means for transmitting each of said first plurality of subsets using a plurality of uniformly spaced tones, a different group of tones being used to transmit each of said subsets, the tones within each group being separated from one another in frequency by a first amount, each group of tones used for transmitting one of said first plurality of subsets being separated in the frequency domain from the nearest one of said groups of tones used for transmitting one of said first plurality of subsets by a second amount which is greater than said first amount.

17. The communications system of claim 16,
wherein said first set of complex values includes N values, N being an integer power of 2, and
wherein said first plurality of subsets includes X subsets, where X is equal to a power of 2.

18. The communications system of claim 17, wherein X is 2.

19. The communications system of claim 18, wherein N is 16.

20. The communications system of claim 17, wherein said first communications device is a mobile node, said communication system further comprising:
a base station including:
means for receiving a signal including the transmitted subsets of complex values; and
means for generating a time delay estimate from at least a portion of the received signal corresponding to the transmitted subsets of complex values.

21. The communications system of claim 20, wherein said base station further includes:
means for transmitting timing control signal to said mobile node, said timing control signal being a function of said generated time delay estimate.

* * * * *